(12) United States Patent
Gardner et al.

(10) Patent No.: US 10,422,574 B1
(45) Date of Patent: Sep. 24, 2019

(54) TANK RESERVOIR AND METHODS OF FORMING

(71) Applicant: Mercury Plastics LLC, Middlefield, OH (US)

(72) Inventors: Scott R. Gardner, Chagrin Falls, OH (US); Donald Currey, Chagrin Falls, OH (US); Grandin Rushlander, Mantua, OH (US)

(73) Assignee: Mercury Plastics LLC, Middlefield, OH (US)

( * ) Notice: Subject to any disclaimer, the term of this patent is extended or adjusted under 35 U.S.C. 154(b) by 0 days.

(21) Appl. No.: 15/602,061

(22) Filed: May 22, 2017

Related U.S. Application Data

(60) Provisional application No. 62/339,514, filed on May 20, 2016.

(51) Int. Cl.
*F25D 23/12* (2006.01)
*B65D 88/02* (2006.01)
(Continued)

(52) U.S. Cl.
CPC ............ *F25D 23/126* (2013.01); *B29C 65/02* (2013.01); *B29C 65/70* (2013.01); *B29C 66/5221* (2013.01); *B65D 1/00* (2013.01); *B65D 25/22* (2013.01); *B65D 88/027* (2013.01); *B29L 2023/005* (2013.01); *B29L 2023/22* (2013.01); *B29L 2031/712* (2013.01);
(Continued)

(58) Field of Classification Search
CPC ..... Y10T 137/86187; Y10T 137/86196; Y10T 137/8622; Y10T 137/86204; B65D 88/027; B65D 25/22; B29L 2031/712; B29L 2023/22; B29L 2023/005; B29C 65/02; F25D 2323/122; F25D 23/126
See application file for complete search history.

(56) References Cited

U.S. PATENT DOCUMENTS

| | | |
|---|---|---|
| 3,722,538 A | 3/1973 | Gezari |
| 4,204,613 A | 5/1980 | Terzian et al. |

(Continued)

FOREIGN PATENT DOCUMENTS

| | | |
|---|---|---|
| CA | 2269687 C | 4/2005 |
| DE | 2341728 A1 | 2/1974 |

(Continued)

OTHER PUBLICATIONS

Whirlpool 4396841 PUR Push Button Side-by-Side Refrigerator Water Filter, http://www.amazon.com/Whirlpool-4396841-Button-Refrigerator-Filter/dp/B000UW2DTE, Oct. 16, 2013, 7 pages.

(Continued)

*Primary Examiner* — Atif H Chaudry
(74) *Attorney, Agent, or Firm* — Hahn Loeser & Parks LLP

(57) ABSTRACT

The invention described herein relates to reservoirs within appliances. The present invention includes a reservoir having one or more tanks having adaptors and tubing which may be thermally welded, crosslinked, and/or overmolded. Particular embodiments of the present invention include reservoirs, reservoir systems including a reservoir, processes for forming a reservoir, and processes for forming the aforementioned reservoir systems.

13 Claims, 14 Drawing Sheets

(51) Int. Cl.
  *B65D 65/02* (2006.01)
  *B65D 25/22* (2006.01)
  *B65D 1/00* (2006.01)
  *B29C 65/70* (2006.01)
  *B29C 65/02* (2006.01)
  *B29C 65/00* (2006.01)
  *B29L 23/00* (2006.01)
  *B29L 31/00* (2006.01)

(52) U.S. Cl.
  CPC .... *F25D 2323/122* (2013.01); *F25D 2500/02* (2013.01); *Y10T 137/8622* (2015.04); *Y10T 137/86187* (2015.04); *Y10T 137/86196* (2015.04); *Y10T 137/86204* (2015.04)

(56) References Cited

U.S. PATENT DOCUMENTS

| | | |
|---|---|---|
| 5,769,138 A | 6/1998 | Sadowski et al. |
| 5,861,200 A | 1/1999 | Rowley |
| 5,895,695 A | 4/1999 | Rowley |
| 5,965,077 A | 10/1999 | Rowley et al. |
| 6,070,916 A | 6/2000 | Rowley |
| 6,082,780 A | 7/2000 | Rowley et al. |
| 6,116,884 A | 9/2000 | Rowley et al. |
| 6,270,125 B1 | 8/2001 | Rowley et al. |
| 6,287,501 B1 | 9/2001 | Rowley |
| 6,485,666 B1 | 11/2002 | Rowley |
| 6,732,543 B2 | 5/2004 | Jenkins, Jr. et al. |
| 6,783,160 B2 | 8/2004 | Rowley |
| 6,838,041 B2 | 1/2005 | Rowley |
| 6,848,719 B2 | 2/2005 | Rowley |
| 6,902,210 B1 | 6/2005 | Rowley |
| 7,118,138 B1 | 10/2006 | Rowley et al. |
| 7,234,317 B2 | 6/2007 | Jenkins, Jr. et al. |
| 7,766,043 B2 | 8/2010 | Thomas et al. |
| 7,819,137 B2 | 10/2010 | Nelson et al. |
| 7,850,898 B1 | 12/2010 | Rowley et al. |
| 7,891,382 B2 | 2/2011 | Rushlander et al. |
| 7,927,534 B1 | 4/2011 | Seman, Sr. et al. |
| 9,297,575 B1 | 3/2016 | Gardner |
| 2006/0260342 A1* | 11/2006 | Jenkins, Jr. ............. F16K 19/00 62/340 |
| 2006/0264044 A1 | 11/2006 | Kobayashi et al. |
| 2007/0039918 A1 | 2/2007 | Lane et al. |
| 2009/0071981 A1 | 3/2009 | Scardino |
| 2010/0163479 A1 | 7/2010 | Kim et al. |
| 2010/0229592 A1 | 9/2010 | Lim et al. |
| 2010/0275637 A1* | 11/2010 | Park ...................... F25D 23/126 62/389 |
| 2011/0126577 A1* | 6/2011 | An .......................... B29C 45/00 62/389 |
| 2012/0068386 A1 | 3/2012 | Rushlander et al. |
| 2012/0277536 A1* | 11/2012 | Kaye ................. A61B 1/00128 600/158 |

FOREIGN PATENT DOCUMENTS

| | | |
|---|---|---|
| DE | 2421359 A1 | 11/1975 |
| EP | 1581378 B1 | 1/2010 |

OTHER PUBLICATIONS

In the Grille Fast-Fill Push Button (2Pack) Other, http://m.whirlpool.com/Home/ProductDetail/4396841P, Oct. 16, 2013, 1 page.

* cited by examiner

TANK RESERVOIR AND METHODS OF FORMING

CROSS REFERENCE TO RELATED APPLICATIONS

This application claims priority to, and the benefit of, U.S. Provisional Application No. 62/339,514 filed on May 20, 2016 with the United States Patent Office, which is hereby incorporated by reference.

BACKGROUND

Reservoirs are used in appliances for storing liquid and/or a water supply. An improved reservoir is needed to increase energy efficiency and improve the fluid dynamics of the system.

SUMMARY

The invention described herein relates to reservoirs within appliances. The present invention includes a reservoir having one or more tanks having adaptors and tubing which may be thermally welded, crosslinked, and/or overmolded.

In examples of a reservoir, the reservoir comprises a primary reservoir tank comprising an extruded elongated tube. The extruded elongated tube has a first tank end, a second tank end, and a tank body, wherein the tank body is located between the first tank end and the second tank end. A inlet adaptor sealingly engages the first tank end. The sealingly engagement creates a leak proof connection. An outlet adaptor sealingly engages the second tank end. An inlet tube is attached to the inlet adaptor and an outlet tube is attached to the outlet adaptor. The extruded elongated tube has a diameter larger than a diameter of the inlet tube and a diameter of the outlet tube. The inlet adaptor is configured to operably connect the inlet tube with the first tank end and the outlet adaptor is configured to operably connect the outlet tube with the second tank end.

In some examples, the tank body forms a u-shape. The first tank end and the second tank end may be operably connected by a support. In an example, the support extends from the inlet adaptor to the outlet adaptor. A transfer tube may be further operably connected with the first tank end at the inlet adaptor and operably connected to the second tank end at the outlet adaptor. The transfer tube may additionally form a u-shape and the u-shaped transfer tube may diametrically oppose the u-shaped tank body.

Some examples of a reservoir may further comprise a secondary reservoir tank. The secondary reservoir tank comprises an extruded elongated tube. The extruded elongated tube has a first tank end, a second tank end, and a tank body. The tank body is located between the first tank end and the second tank end. A secondary inlet adaptor sealingly engages the first tank end of the secondary reservoir tank. A secondary outlet adaptor sealingly engages the second tank end of the secondary reservoir tank. The outlet tube of the primary reservoir tank is attached to the secondary inlet adaptor. A secondary outlet tube of the secondary reservoir tank is attached to the secondary outlet adaptor. The extruded elongated tube of the secondary reservoir tank has a diameter larger than the diameter of the outlet tube of the primary reservoir tank and a diameter of the secondary outlet tube. The secondary inlet adaptor is configured to operably connect the outlet tube of the primary reservoir tank with the first tank end of the secondary reservoir tank. The secondary outlet adaptor is configured to operably connect the outlet tube of the secondary reservoir tank with the second tank end of the secondary reservoir tank.

In some examples, the outlet tube may be parallel to a length of the primary reservoir tank. The outlet tube may also be positioned between the primary reservoir tank and the secondary reservoir tank. In one example, the secondary outlet tube of the secondary reservoir tank is parallel to a length of the secondary reservoir tank and positioned between the primary reservoir tank and the secondary reservoir tank. Further, the outlet tube and the secondary outlet tube may be parallel between the primary reservoir tank and the secondary reservoir tank.

Some examples of a reservoir may further comprise a bracket assembly. The bracket assembly is for securing the primary reservoir tank to the secondary reservoir tank. The outlet tube may pass through an aperture in the bracket assembly. The secondary outlet tube may also pass through the aperture in the bracket assembly. The bracket assembly may also include a mounting structure adapted for securing the reservoir to a refrigerator.

In some examples, the sealingly engagement of the inlet adaptor to the first tank end and the sealingly engagement of the outlet adaptor to the second tank end are thermal welds. Likewise, the sealingly engagement of the secondary inlet adaptor to the first tank end of the secondary reservoir tank and the sealingly engagement of the secondary outlet adaptor to the second tank end of the secondary reservoir tank may be thermally welded. The sealingly engagement creates leak proof connections. Further, the attachment of the inlet adaptor to the inlet tube is an overmold and the attachment of the outlet adaptor to the outlet tube is an overmold, in some examples. Likewise, the attachment of the secondary inlet adaptor to the outlet tube is an overmold and the attachment of the secondary outlet adaptor to the outlet tube of the secondary reservoir tank is an overmold, in some examples.

Examples of a process for forming a reservoir are also provided. The process for forming a reservoir includes providing a primary reservoir tank comprising an extruded elongated tube having a first tank end, a second tank end, and a tank body. The tank body is located between the first tank end and the second tank end. Also included is providing an inlet tube and an outlet tube. The process further comprises overmolding an inlet adaptor onto an end of the inlet tube and overmolding an outlet adaptor onto an end of the outlet tube; crosslinking the inlet tube and the inlet adaptor to a first degree; thermally welding the inlet adaptor to the first tank end; thermally welding the outlet adaptor to the second tank end; and crosslinking the primary reservoir tank including the first tank end, the second tank end, the inlet tube, the outlet tube, the inlet adaptor, and the outlet adaptor to a second degree.

In another example of a process for forming a reservoir, a primary reservoir tank comprising an extruded elongated tube is provided. The extruded elongated tube has a first tank end, a second tank end, and a tank body. An inlet tube and an outlet tube is also provided. The process further comprises overmolding an inlet adaptor onto an end of the inlet tube and overmolding an outlet adaptor onto an end of the outlet tube; shielding each of the first tank end and the second tank end of the primary reservoir tank; crosslinking the unshielded tank portion of the primary reservoir tank to a first degree; bending the unshielded tank portion to form a U-shape; thermally welding the inlet adaptor to the first tank end and thermally welding the outlet adaptor to the second tank end; and crosslinking the primary reservoir tank including the first tank end, the second tank end, the inlet tube, the outlet tube, the inlet adaptor, and the outlet adaptor to a second degree.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

Embodiments of the present invention include reservoirs, reservoir systems including a reservoir, processes for forming a reservoir, and processes for forming the aforementioned reservoir systems. Specifically, the present invention includes a reservoir made of one or more reservoir tanks, adaptors, and/or tubing in various configurations for forming a reservoir. The reservoir tanks, adaptors, and/or tubing may be thermally welded, crosslinked, and/or overmolded. The reservoir is intended to store cold water in a refrigerator. A benefit of this reservoir is the specific location of it in the refrigerator. It can be located within the liner of the refrigerator due to the length and narrowness of the design. For example, in one embodiment, the overall width or diameter of the reservoir will be between an inch and two inches. Currently, no reservoirs are located within a liner due to space limitations. Thus, this design frees up additional space for storage in a refrigerator. It, however, may be provided for use with other liquid storage.

Figure 1:
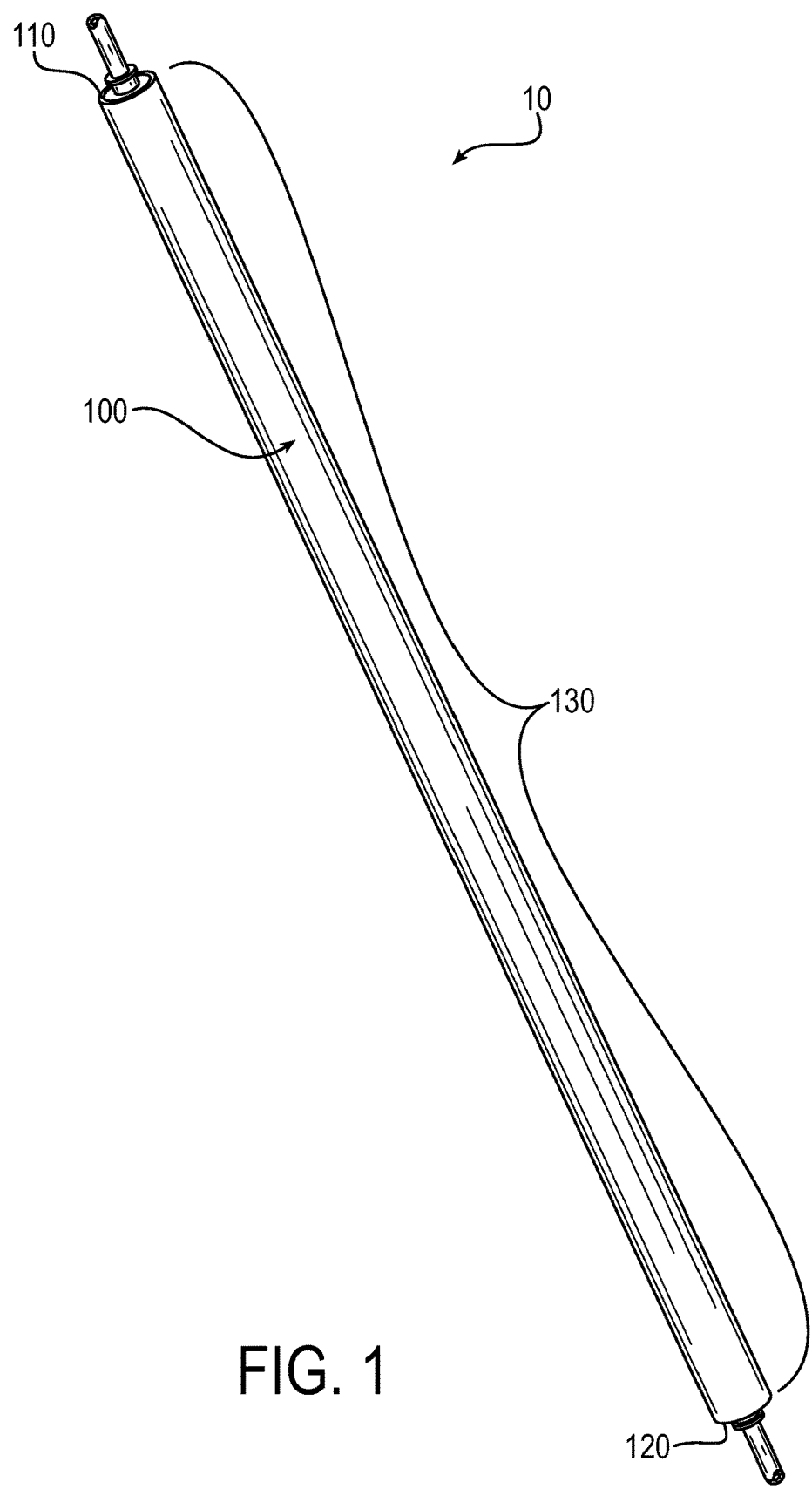
FIG. 1 is an isometric view of a reservoir, in accordance with an example.
Figure 2:
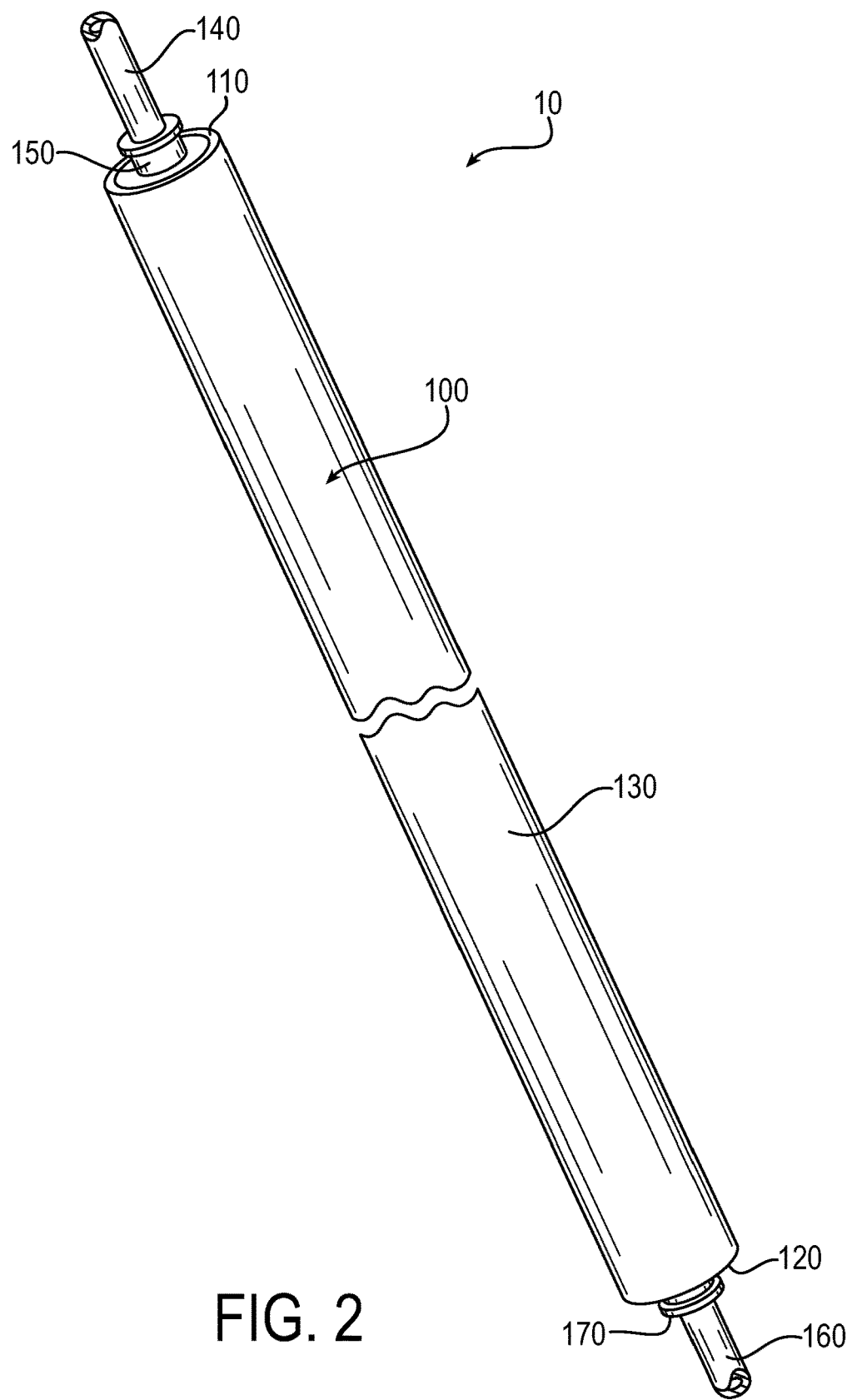
FIG. 2 is an enlarged and segmented isometric view of the reservoir of FIG. 1, in accordance with an example.
Figure 3:
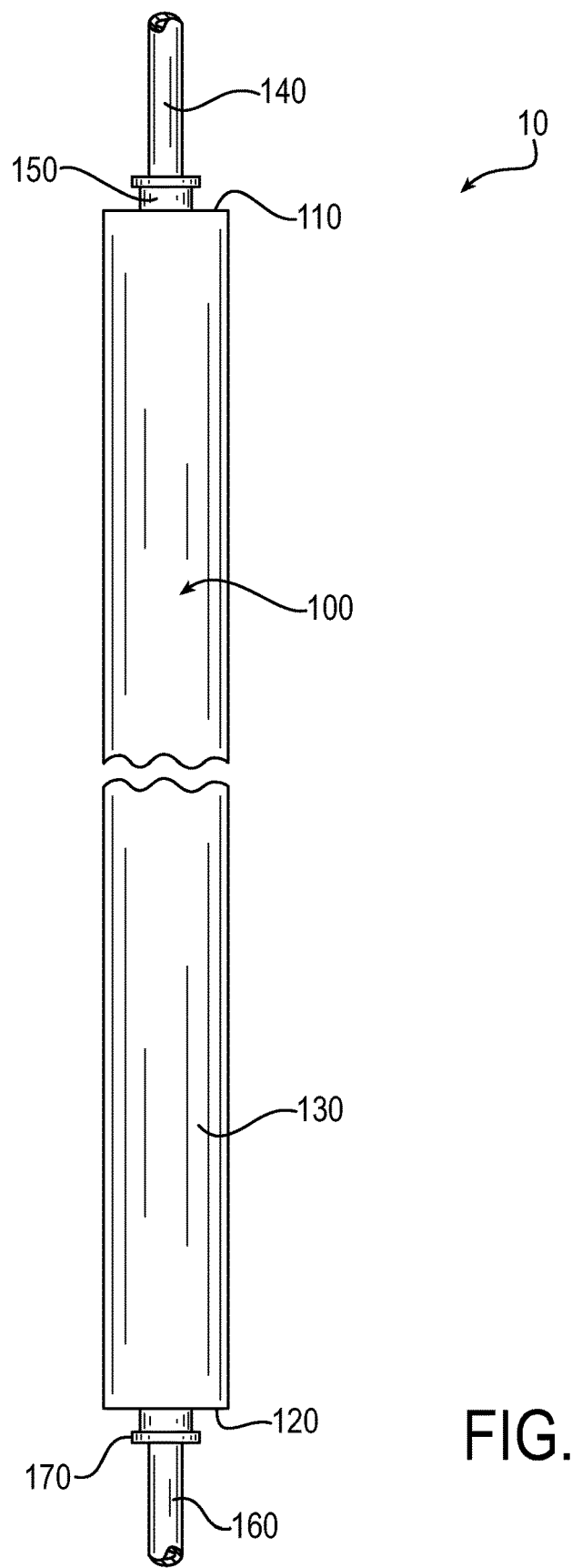
FIG. 3 is a side view of the reservoir of FIG. 1, in accordance with an example.

In particular examples, processes for forming a reservoir 10 includes providing a primary reservoir tank 100, as illustrated by FIGS. 1-5. In FIGS. 1-3, the primary reservoir tank 100 has a first tank end 110, a second tank end 120, and a tank body 130. The tank body 130 as illustrated in FIGS. 1-3 is cylindrical. However, the tank body may be any geometric configuration known to one skilled in the art, such as conical, spherical, cubical, a combination thereof, or the like. In some embodiments, the tank body may be shaped to conform with the available space within a refrigerator. In FIGS. 1-3, the first tank end 110 is orientated opposite the second tank end 120, relative to the tank body 130.

Figure 4:
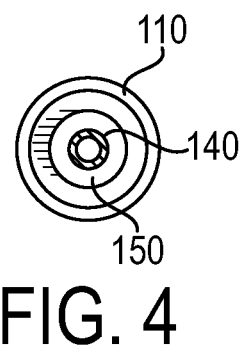
FIG. 4 is an end view of the reservoir of FIG. 1, in accordance with an example.
Figure 5:
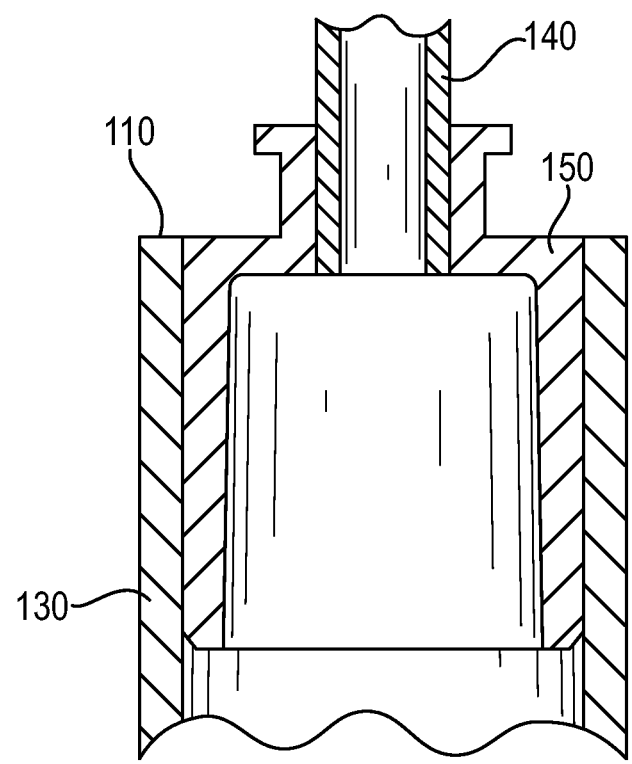
FIG. 5 is a cross-sectional side view of a first tank end of the reservoir of FIG. 1, in accordance with an example.
Figure 6:
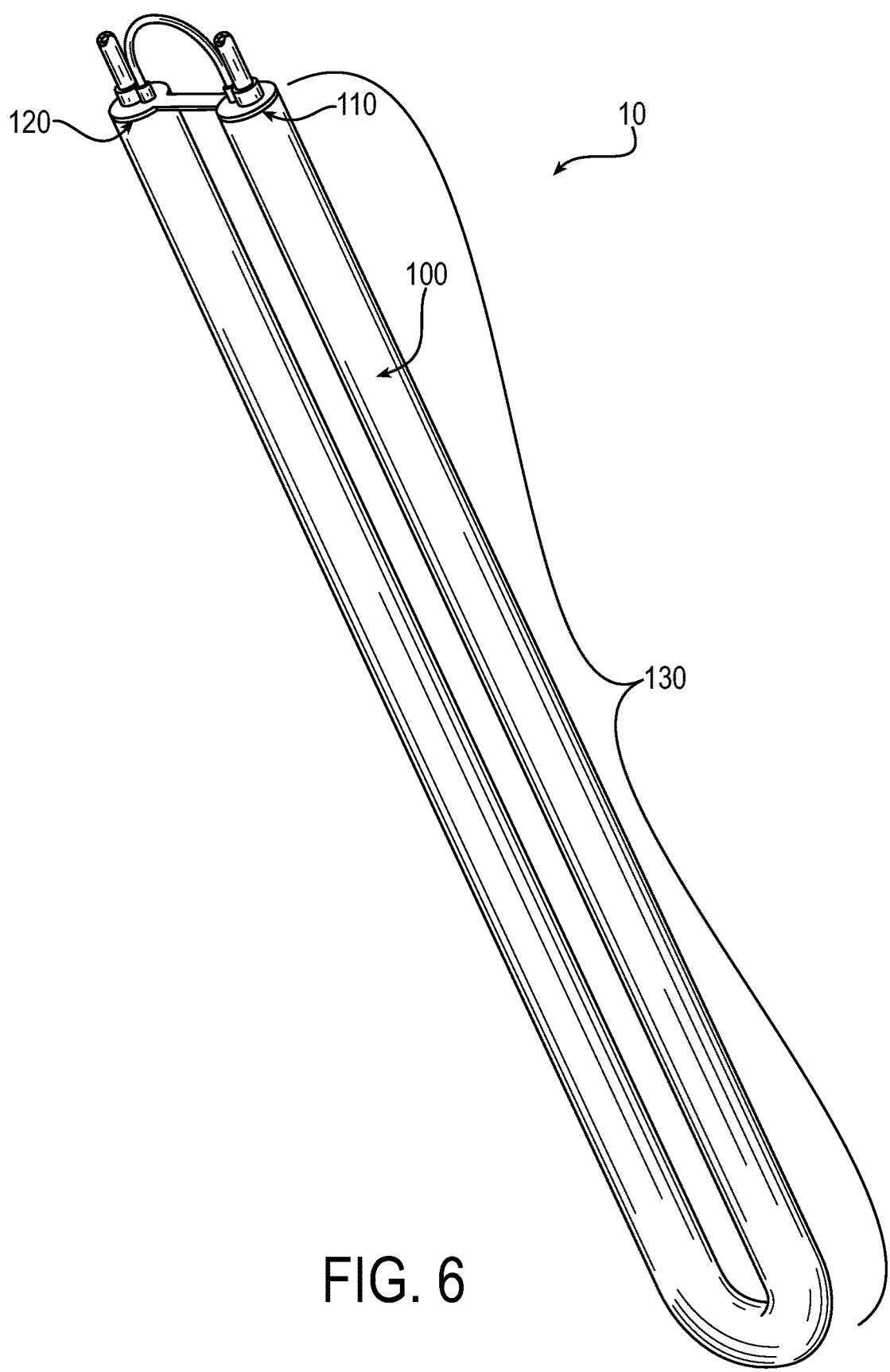
FIG. 6 is an isometric view of a reservoir, in accordance with an example.

With particular reference to FIGS. 2-3, an inlet tube 140 and an inlet adaptor 150 are located at the first tank end 110. The inlet tube 140 is attached to the inlet adaptor 150 and the inlet adaptor 150 is positioned at or within the first tank end 110. In this particular example, the inlet tube 140 is inserted into the inlet adaptor 150. Likewise, an outlet tube 160 and an outlet adaptor 170 is located at the second tank end 120. In some examples, the inlet tube may be a fitting for connecting to a supply line. Similarly, in some examples, the outlet tube may be a fitting for connecting to a service line. Alternatively, the fittings, inlet tube, and/or outlet tubes may be formed in or a part of the inlet adaptor or outlet adaptor, respectively. As illustrated by FIGS. 4-5, the inlet adaptor 150 is configured to operably connect the inlet tube 140 with the first tank end 110. Likewise, the outlet adaptor 170 is configured to operably connect the outlet tube 160 with the second tank end 120. Operably connecting may include thermal welding, crosslinking, and/or overmolding each component to adjoining components and/or intermediate components as will be described in greater detail below. Features which are operably connected to other features may not be directly connected, but, instead may be connected through intermediate or intervening features. Operably connecting may also include directly connecting.

The process for forming a reservoir comprises shielding each of the first tank end and the second tank where the first tank end and the second tank end become a shielded tank portion. The shielded tank portion is isolated from an unshielded tank portion at the tank body. Shielding provides for a portion of the assembly to be shielded from radiation by a shield. More specifically, crosslinking, discussed in greater detail below, may be controlled by shielding. The amount of crosslinking in each component may be controlled independently to provide shielding to shield all of, or portions of, one or more components in the assembly from the crosslinking radiation. The placement of a shield of aluminum or steel or other shielding material over a portion of the assembly, as desired, inhibits radiation beneath the shield and, thereby inhibits crosslinking beneath the shield. The shield may be placed to shield a portion of the assembly for a predetermined number of passes under the radiation beam, and then the shield removed unshielding the previously shielded portion to be exposed to crosslinking. Alternatively, the shield may be removed for a predetermined number of passes beneath the electron beam to establish a desired crosslinking percentage, and the shield put in place to shadow a portion of the assembly for the remainder of passes under the radiation beam enabling for unshielded portion to receive additional crosslinking. In yet another alternative, for certain applications the shield may remain in place for all of the passes under the electron beam. In one example, the assembly may be placed on a conveyor passing under an electron beam. A shield may be positioned over a portion of the assembly, such as over a first tank end or a second tank end to inhibit crosslinking of the fitting as the assembly passes beneath the electron beam on the conveyor. The conveyor may be a cart, a conveyor belt, or any other vehicle or conveyance suitable to support the assembly passing through the electron beam. A fixture may be provided on the conveyor to support, orient and/or position certain assemblies and shields as desired as the assembly passes through the electron beam.

The process for forming a reservoir tank may comprise crosslinking and thermal welding. In an example of the process for forming a reservoir, the process comprises crosslinking the unshielded tank portion. The process may also comprise connecting an inlet tube to a first adaptor and thermally welding the first adaptor to the first tank end of the shielded tank portion. Moreover, the process may also comprise connecting an outlet tube to a second adaptor and thermally welding the second adaptor to the second tank end of the shielded tank portion.

In an example for forming a reservoir tank, the process comprises unshielding the shielded tank portion, including each of the first tank end and the second tank end. Thereafter, the process comprises crosslinking the primary reservoir tank, including the first tank end, the second tank end, the inlet tube, the outlet tube, the inlet adaptor, and the outlet adaptor. In a particular example, the step of crosslinking the primary reservoir tank occurs after the steps of connecting an inlet tube, connecting an outlet tube, and unshielding the shielded tank portion.

The process for forming a reservoir further comprises a step of shaping the primary reservoir tank after the step of crosslinking the unshielded tank portion. In one example, the process comprises forming the primary reservoir tank into a u-shape after the step of crosslinking the unshielded tank portion. Turning to FIGS. 6-10, the primary reservoir tank 100 of the reservoir 10 comprises a tank body 130 that is u-shaped. Here, the first tank end 110 remains oriented opposite the second tank end 120, relative to the tank body 130. Yet, the first tank end 110 is positioned at the same end as the second tank end 120 relative to the tank length $L_{100}$ (as illustrated in FIG. 8). In some examples, the first tank end may be oriented opposite the second tank end, relative to the tank body, yet, be positioned at different locations along the tank length.

Figure 7:
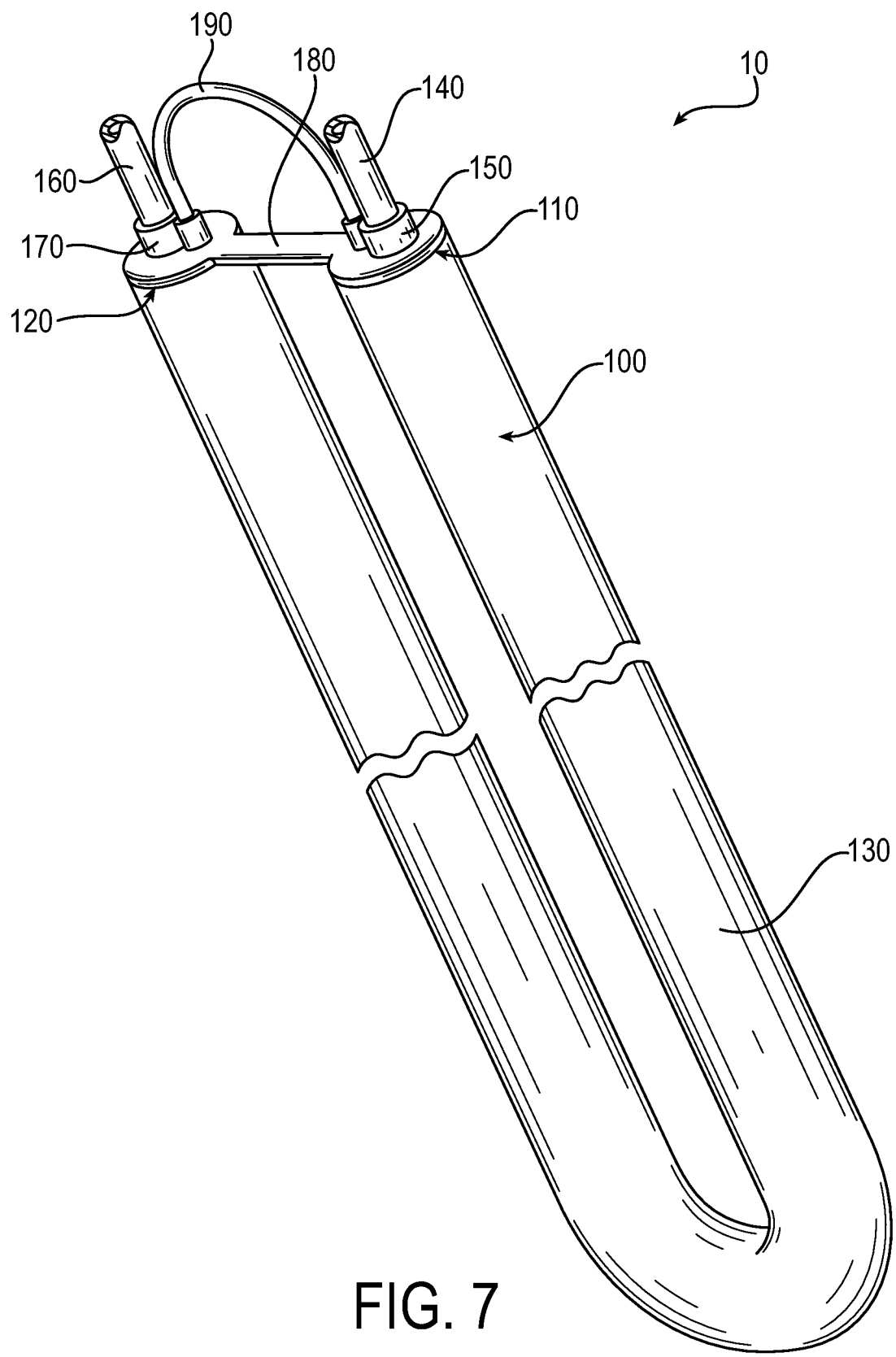
FIG. 7 is an enlarged and segmented isometric view of the reservoir of FIG. 6, in accordance with an example.
Figure 8:
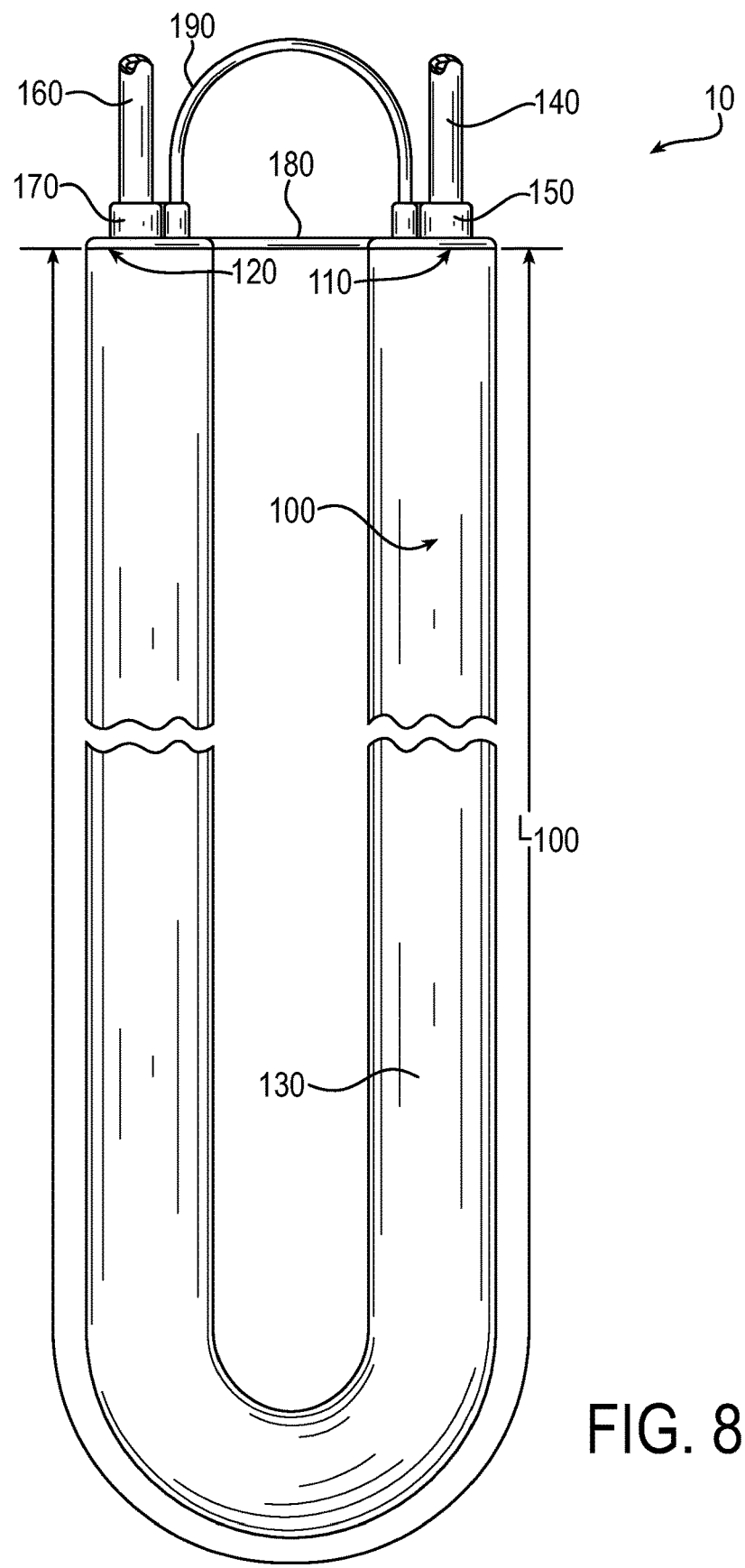
FIG. 8 is a side view of the reservoir of FIG. 6, in accordance with an example.
Figure 9:
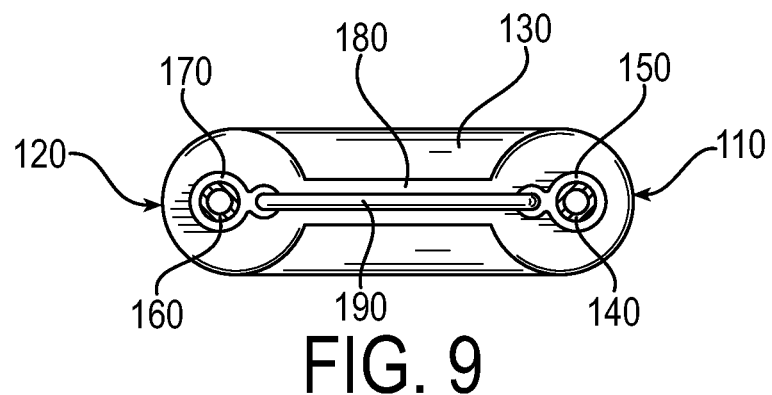
FIG. 9 is an end view of the reservoir of FIG. 6, in accordance with an example.

As illustrated in FIGS. 7-9, the first tank end 110 is in communication with or operably connected to the second tank end 120 by a support 180. The support 180 extends from the inlet adaptor 150 to the outlet adaptor 170 and is formed as a part of the inlet adaptor 150 and the outlet adaptor 170. In some examples, the support may be separate from the inlet adaptor and/or the outlet adaptor and connected by other means to the inlet adaptor, outlet adaptor, the first tank end, and/or the second tank end. Examples of other means for connecting may include strapping, adhesive, mechanical fasteners, a combination thereof, or the like. In some examples, the support may be a part of or extend from the inlet tube, the outlet tube, the first tank end, and/or the second tank end.

Figure 10:
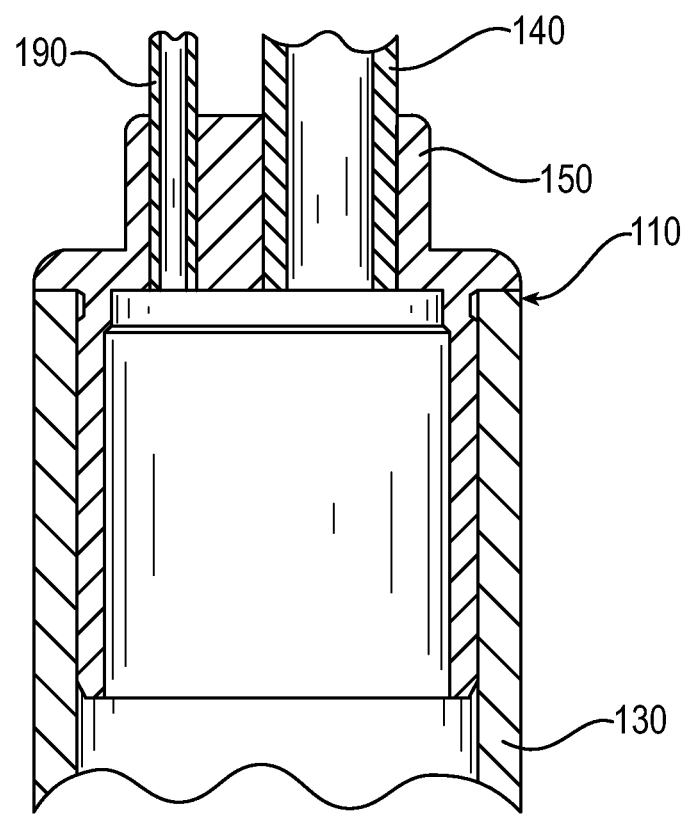
FIG. 10 is a cross-sectional side view of a first tank end of the reservoir of FIG. 6, in accordance with an example.
Figure 11:
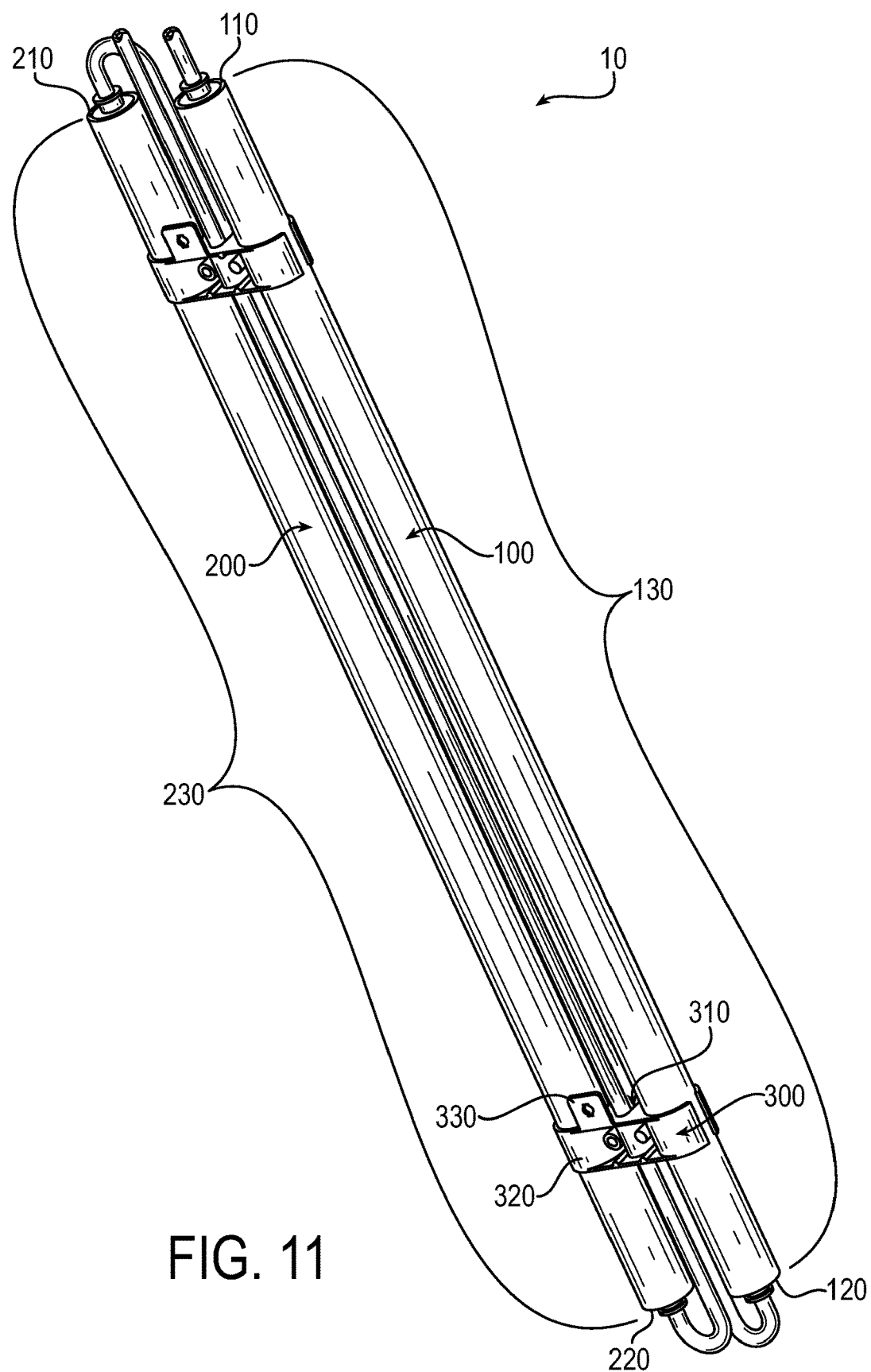
FIG. 11 is an isometric view of a reservoir, in accordance with an example.
Figure 12:
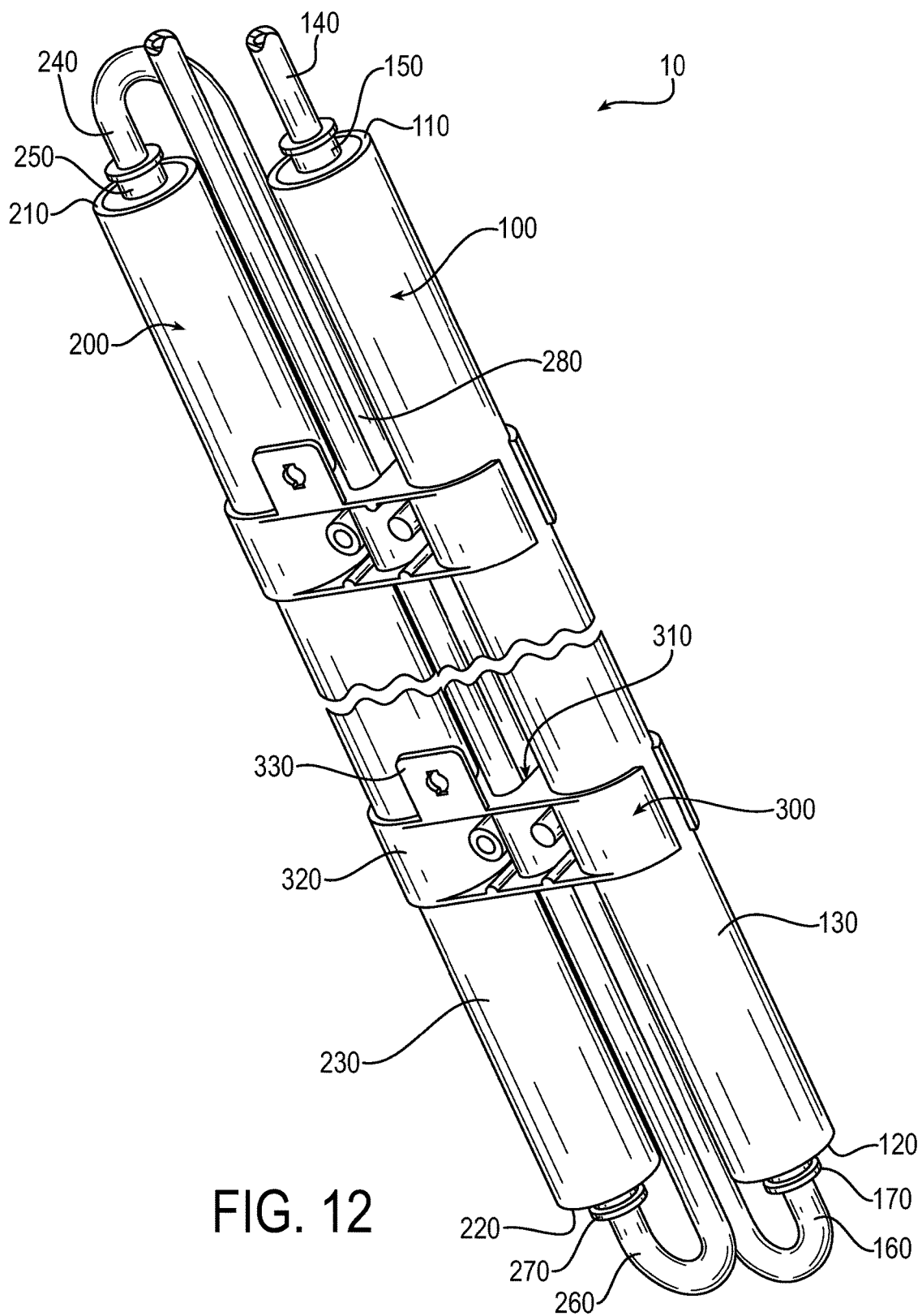
FIG. 12 is an enlarged and segmented isometric view of the reservoir of FIG. 11, in accordance with an example.
Figure 13:
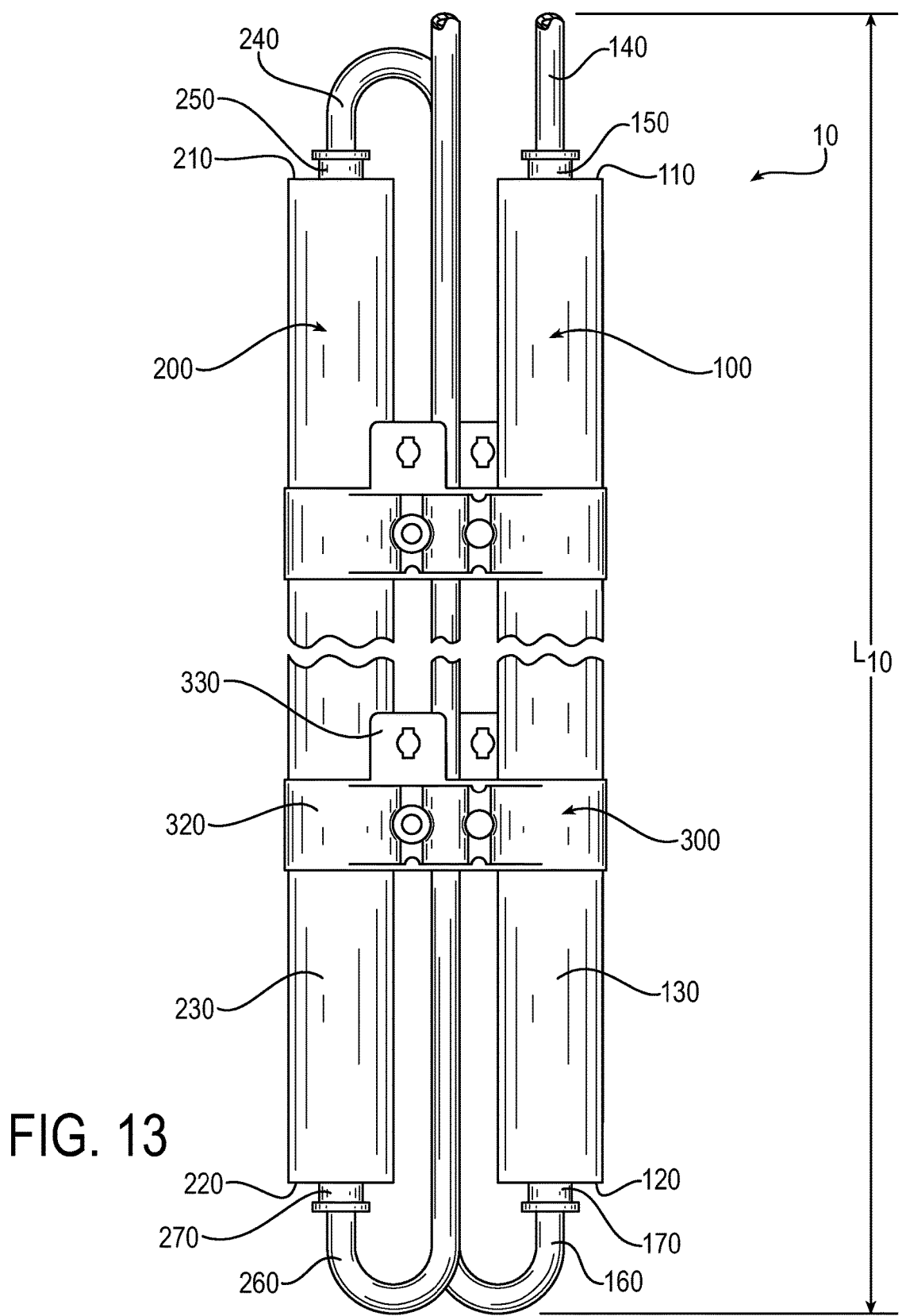
FIG. 13 is a side view of the reservoir of FIG. 11, in accordance with an example.
Figure 14:
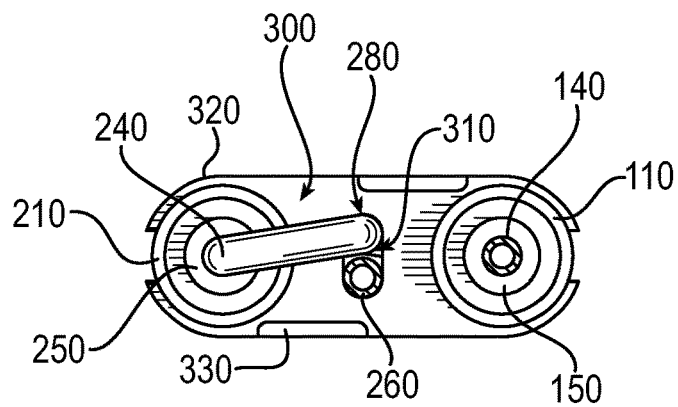
FIG. 14 is an end view of the reservoir of FIG. 11, in accordance with an example.

A transfer tube 190 is also illustrated in FIGS. 7-10. A transfer tube 190 is shown operably connected with the first tank end 110 and the second tank end 120, extending between the first tank end 110 and the second tank end 120. A transfer tube is provided to allow air pressure to equalize between two or more vertical portions of a tank body, such as two vertical portions in a u-shape tank body. Otherwise, air may become trapped within a vertical portion. By equalizing the air pressure between vertical portions of a tank body, the air will vent to an outlet tube and allow the entire reservoir to fill with liquid. In this particular example, the transfer tube 190 is operably connected to the first tank end 110 and the second tank end 120 through the inlet adaptor 150 and the outlet adaptor 170, respectively. FIG. 10 illustrates a cross-sectional view of the primary reservoir tank 100 at the first tank end 110 having an inlet tube 140, an inlet adaptor 150, and a transfer tube 190. The transfer tube may additionally be thermally welded, crosslinked, and/or overmolded. The transfer tube may also be referred to as a jumper tube. In other examples, the transfer tube may be directly connected to the inlet tube, the outlet tube, the first tank end, the second tank end, and/or the tank body. In some examples, the transfer tube may provide structural support between the first tank end and the second tank end, thereby also being a support. In FIGS. 7-9 the transfer tube 190 forms a u-shape. In particular, the u-shape of the transfer tube 190 is diametrically opposed to the u-shape of the tank body 130.

In yet another example, the reservoir may comprise multiple reservoir tanks. Thereby, the process for forming a reservoir may further comprise the step of connecting the outlet tube to a secondary inlet adaptor of a secondary reservoir tank. In FIGS. 11-14, a reservoir 10 comprising a primary reservoir tank 100 and a secondary reservoir tank 200 is illustrated. Like the primary reservoir tank 100, the secondary reservoir tank 200 has a first tank end 210, a second tank end 220, and a tank body 230. The first tank end 210 is oriented opposite the second tank end 220, relative to the tank body 230. The outlet tube 160 (which may also be referred to as a secondary inlet tube 240 and/or a connecting tube 280) and an secondary inlet adaptor 250 are located at the first tank end 210. The outlet tube 160 is attached to the secondary inlet adaptor 250 and the secondary inlet adaptor is positioned at or within the first tank end 210. In this example, the outlet tube 160 is inserted into the secondary inlet adaptor 250. Likewise, a secondary outlet tube 260 and a secondary outlet adaptor 270 is located at the second tank end 220. The secondary inlet adaptor 250 is configured to operably connect the outlet tube 160 with the first tank end 210 and the secondary outlet adaptor 270 is configured to operably connect the secondary outlet tube 260 with the second tank end 220. In this particular example, the outlet tube 160 of the primary reservoir tank 100 is the secondary inlet tube 240 of the secondary reservoir tank 200 and may be collectively referred to as a connecting tube 280 since it operably connects the primary reservoir tank 100 to the secondary reservoir tank 200. By linking multiple tubes together in series no air is trapped in the system which yields a more efficient design and provides a greater quantity of stored liquid. Moreover, to further facilitate the removal of or to eliminate trapped air, the outlet tubes, of the respective reservoir tank, may be placed at a vertical top of the reservoir.

In FIGS. 11-14, the first tank end 110 of the primary reservoir tank 100 and the first tank end 210 of the secondary reservoir tank 200 are oriented to a first end 20 of the reservoir 10, relative to a reservoir length $L_{10}$. The second tank end 120 of the primary reservoir tank 100 and the second tank end 220 of the secondary reservoir tank are oriented to a second end 30 of the reservoir 10, relative to the reservoir length $L_{10}$. In FIGS. 11-14, the first end 20 of the reservoir is opposite the second end 30 of the reservoir 10. It, however, is contemplated that a variety of geometric configurations may be used and each respective tank having a respective geometric configuration may be orientated in a variety of manners. In FIGS. 11-14, connecting tube 280 travels parallel to the reservoir length $L_{10}$ and is located between the primary reservoir tank 100 and the secondary reservoir tank 200. In some examples, the connecting tube may additionally or alternatively travel about the primary reservoir tank and/or the secondary reservoir tank. In other words, the connecting tube may extend a portion of or the entire perimeter of the reservoir.

Figure 15:
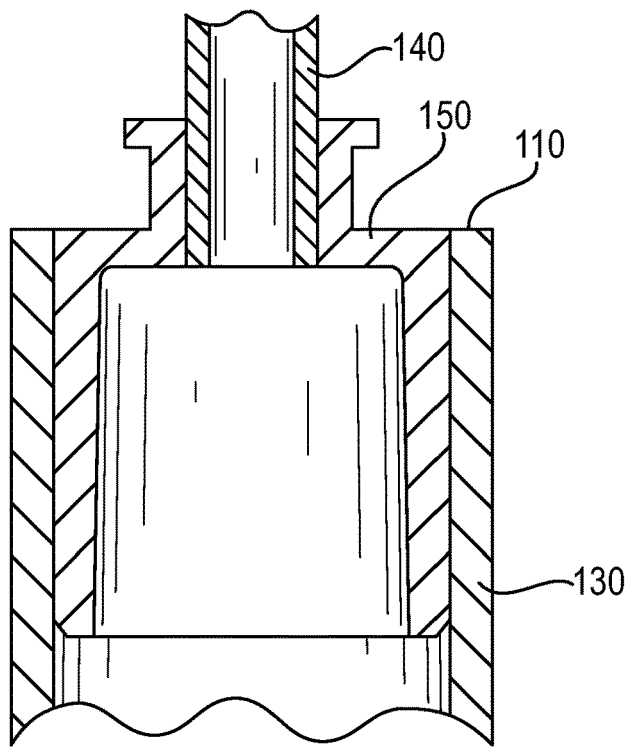
FIG. 15 is a cross-sectional side view of a first tank end of the primary reservoir tank of the reservoir of FIG. 11, in accordance with an example.

Still referring to FIGS. 11-14, the secondary outlet tube 260 travels parallel to the reservoir length $L_{10}$ or, otherwise stated, parallel to the connecting tube 280. Similar to the connecting tube 280, the secondary outlet tube 260 is between the primary reservoir tank 100 and the secondary reservoir tank and is, therefore, adjacent to the connecting tube 280. In some embodiments, the inlet tube of the primary reservoir tank may, additionally or alternatively, travel parallel to the reservoir length, parallel to the connecting tube, and/or between the primary reservoir tank and the secondary reservoir tank. In FIGS. 11-14, the secondary outlet tube 260 is offset from and also parallel to the inlet tube 140 of the primary reservoir tank 100. FIG. 15 illustrates a cross-sectional view of the primary reservoir tank 100 have a tank body 130, a first tank end 110, an inlet tube 140, and an inlet adaptor 150.

Figure 16:
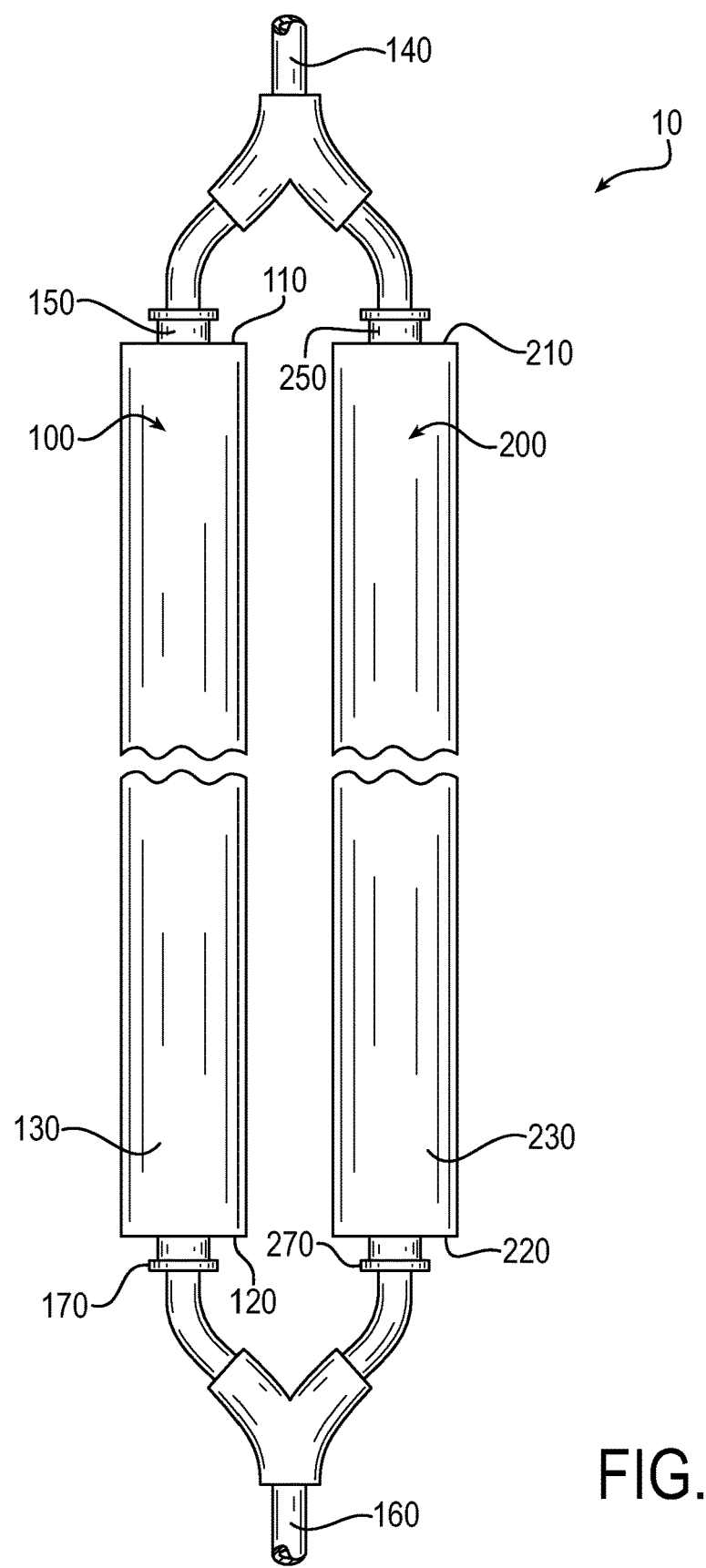
FIG. 16 is a side view of a reservoir, in accordance with an example.

Turning to FIG. 16, an alternative example of a reservoir is illustrated. In this example, the reservoir 10 comprises a primary reservoir tank 100 and a secondary reservoir tank 200. An inlet tube 140 is connected to both the primary reservoir tank 100 and the secondary reservoir tank 200 in a Y-shape. As illustrated, a fitting may be provided to connect multiple tubes to form the inlet tube 140. The fitting is Y-shaped with a tube connected at the three ends formed in the Y configuration. In another example, the inlet tube may be Y-shape, itself. The inlet tube 140 operably connects to both the primary reservoir tank 100 and the secondary reservoir tank 200. The inlet tube 140 is operably connected to the primary reservoir tank 100 at a first tank end 110 of the primary reservoir tank and to the secondary reservoir tank 200 at a first tank end 210 of the secondary reservoir tank. An inlet adaptor 150 of the primary reservoir tank and a secondary inlet adaptor 250 of the secondary reservoir tank are illustrated at these connections, respectively. Similarly, an outlet tube 160 is also connected to both the primary reservoir tank 100 and the secondary reservoir tank 200 in a Y-shape. As illustrated, a fitting may be provided to connect multiple tubes to form the outlet tube 160. The fitting is Y-shaped with a tube connected at the three ends formed in the Y configuration. In another example, the inlet tube may be Y-shape, itself. The outlet tube 160 operably connects to both the primary reservoir tank 100 and the secondary reservoir tank 200. The outlet tube 160 is operably connected to the primary reservoir tank 100 at a second tank end 120 of the primary reservoir tank and to the secondary reservoir tank 200 at a second tank end 220 of the secondary reservoir tank. An outlet adaptor 170 of the primary tank and an secondary outlet adaptor 270 of the secondary reservoir tank are illustrated at these connections, respectively. A tank body 130 is located between the first tank end 110 and the second tank end 120 of the primary reservoir tank 100. Likewise, a tank body 230 is located between the first tank end 210 and the second tank end 220 of the secondary reservoir tank 200.

Figure 17:
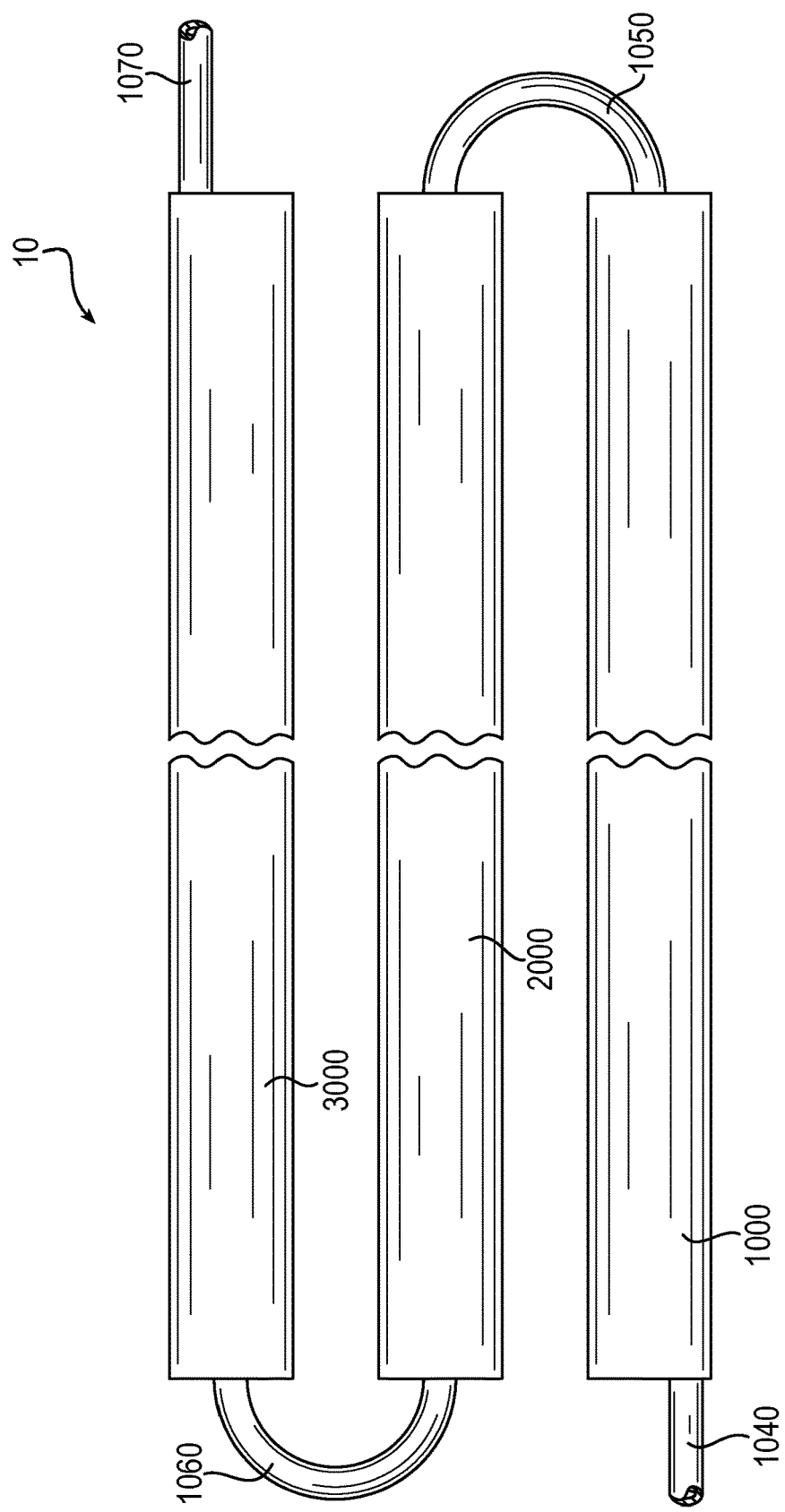
FIG. 17 is a side view of a reservoir, in accordance with an example.

In yet another example, a reservoir is illustrated in FIG. 17. In FIG. 17, the reservoir 10 comprises a primary reservoir tank 1000, a secondary reservoir tank 2000, and a third reservoir tank 3000. The primary reservoir tank 1000, the secondary reservoir tank 2000, and the third reservoir tank 3000 are connected in series where each tank is orientated in the horizontal position (i.e. the primary reservoir tank 1000 is below the secondary reservoir tank 2000, and the secondary reservoir tank 2000 is below the third reservoir tank 3000. In particular, an inlet tube 1040 is operably connected to the primary reservoir tank 1000. As described with respect to the examples above, the inlet tube may be operatively connected to the primary reservoir tank at an inlet adaptor. A first connector tube 1050 is operably connected to the primary reservoir tank 1000 at the opposite end of the primary reservoir tank as the inlet tube 1040. Again, an adaptor may be provided to operably connect the first connector tube 1050 to the primary reservoir tank 1000. The first connector tube 1050 is operably connected to the secondary reservoir tank 2000. Again, an adaptor may be provided. A second connector tube 1060 is operably connected to the secondary reservoir tank 2000 at the opposite end of the secondary reservoir tank as the first connector tube 1050. Again, an adaptor may be provided. The second connector tube 1060 is operably connected to the third reservoir tank 3000. Again, an adaptor may be provided. An outlet tube 1070 is also connected to the third reservoir tank 3000. Again, an outlet adaptor may be provided. The outlet tube 1070 is connected to the third reservoir tank 3000 at the opposite end of the third reservoir tank as the second connector tube 1060. As illustrated by FIG. 17, the inlet tube 1040 and the outlet tube 1070 are offset at their respective ends of the primary reservoir tank 1000 and the third reservoir tank 3000, respectively. By offsetting the inlet tube 1040 and/or the outlet tube 1070, air entrapment is reduced or eliminated in the system. Additional tanks may be included in the series.

The process for forming a reservoir comprises shielding each of the first tank end and the second tank end of the secondary reservoir tank, where the first tank end and the second tank end become a shielded tank portion of the secondary reservoir tank. The shielded tank portion is isolated from an unshielded tank portion at the tank body of the secondary reservoir tank. As mentioned with respect to the primary reservoir tank, shielding provides for a portion of the assembly to be shielded from radiation by a shield. More specifically, crosslinking, discussed in greater detail below, may be controlled by shielding.

The process for forming a reservoir tank may also comprise crosslinking and thermal welding the features of the secondary reservoir tank. In an example of the process for forming a reservoir, the process comprises crosslinking the unshielded tank portion of the secondary reservoir tank. The process may also comprise connecting an inlet tube to a first adaptor of the secondary reservoir tank and thermally welding the first adaptor to the first tank end of the shielded tank portion of the secondary reservoir tank. Moreover, the process may also comprise connecting an outlet tube to a outlet adaptor and thermally welding the outlet adaptor to the second tank end of the shielded tank portion of the secondary reservoir tank.

Similar to the primary reservoir tank, the process may also comprise unshielding the shielded tank portion of the secondary reservoir tank, including each of the first tank end and the second tank end of the secondary reservoir tank. Thereafter, the process comprises crosslinking the secondary reservoir tank including the first tank end, the second tank end, the inlet tube, the outlet tube, the inlet adaptor, and the outlet adaptor of the secondary reservoir tank. In a particular example, the step of crosslinking the secondary reservoir tank occurs after the steps of connecting an inlet tube, connecting an outlet tube, and unshielding the shielded tank portion of the secondary reservoir tank.

The secondary reservoir tank, and/or any additional tank, may also be shaped. In particular, the process for forming a reservoir may further comprises a step of shaping the secondary reservoir tank, and/or any additional tank, after the step of crosslinking the unshielded tank portion.

In the illustrated examples, the cross-section of the tank body of the primary reservoir tank and cross-section of the tank body of the secondary reservoir tank is greater than the cross-section of the inlet tube and/or outlet tube of the corresponding reservoir tank. By having a larger tank body, a much larger quantity of water may be contained per cubic volume versus using a reservoir having a longer but smaller cross-section.

As illustrated by FIGS. 11-14, the reservoir 10 may also comprise a bracket assembly 300. In this particular example, the bracket assembly 300 comprises one or more apertures 310, one or more tank braces 320, and one or more mounting structures 330. The bracket may be reversible so that a single molded part can be used for both the front and the back bracket. In this particular embodiment, the bracket assembly 300 secures the primary reservoir tank 100 to the secondary reservoir tank 200. A tank brace 320 is located at, and at least partially wraps around, the primary reservoir tank 100 to secure the primary reservoir tank 100 to the bracket assembly 300. Another tank brace 320, of the bracket assembly, is located at, and at least partially wraps around, the secondary reservoir tank 200 to secure the secondary reservoir tank 200 to the bracket assembly 300. An aperture 310 is positioned between the tank braces 320 and the connecting tube 280 travels through the aperture 310. Likewise, the secondary outlet tube 260 also travels through an aperture 310. The aperture may serve as a guide channel for one or more tubes in the system. The aperture, through which the secondary outlet tube 260 travels, may be the same aperture the connecting tube travels or a different aperture. In this example, the bracket assembly also includes a mounting structure 330. The mounting structure is an extension of the bracket assembly which may be fastened to a refrigerator or other structure, for securing the reservoir to the refrigerator or other structure. Any fastener known by one of ordinary skill in the art may be provided to fasten the mounting structure to the refrigerator, including mechanical fasteners, adhesives, magnets, a combination thereof, or the like. Multiple mounting structures may be provided.

In some examples, the inlet adaptor, outlet adaptor, inlet tube, and/or outlet tube may be an overmolded attachment piece or used in combination with an overmolded attachment piece for overmolding to one another and/or the first tube end or the second tube end. In other words, the process for forming a reservoir may further comprise a step of overmolding the inlet adaptor and the inlet tube of the primary reservoir tank and/or the secondary reservoir tank, and/or overmolding the outlet adaptor and the outlet tube of the primary reservoir tank and/or the secondary reservoir tank. The overmolding may occur before, after, or in combination with forming or shaping a reservoir tank body and/or a tube. The overmolded attachment piece forms a leak-proof connection to a reservoir or tube. In particular, the melt fusion, blending or alloying, as described further below, forms a seal between the overmolded attachment piece and the tube. By example, the overmolded attachment piece and the tube become miscible. In some examples, the bracket assembly, or a portion thereof, may also be overmolded. The bracket assembly may be overmolded in combination with overmolding the inlet adaptor(s), the outlet adaptor(s), the inlet tube(s), and/or the outlet tube(s). Thus, in some of these examples, the overmolded bracket may be located adjacent to or at the adaptor(s) and tube(s), relative the tank body. Overmolding occurs before crosslinking the portion of the reservoir being overmolded. Overmolding and crosslinking are discussed in greater detail below.

In various examples, the overmolded attachment piece is secured to the fitting by shape memory. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials. Shape memory and shape memory materials are discussed in greater detail, below.

As used in this application, the term "overmold" means the process of injection molding a second polymer over a first polymer, wherein the first and second polymers may or may not be the same. In one embodiment of the invention, the composition of the overmolded polymer will be such that it will be capable of at least some melt fusion with the composition of the polymeric tube. There are several means by which this may be affected. One of the simplest procedures is to insure that at least a component of the polymeric tube and that of the overmolded polymer is the same. Alternatively, it would be possible to insure that at least a portion of the polymer composition of the polymeric tube and that of the overmolded polymer is sufficiently similar or compatible so as to permit the melt fusion or blending or alloying to occur at least in the interfacial region between the exterior of the polymeric tube and the interior region of the overmolded polymer. Another manner in which to state this would be to indicate that at least a portion of the polymer compositions of the polymeric tube and the overmolded polymer are miscible. In contrast, the chemical composition of the polymers may be relatively incompatible, thereby not resulting in a material-to-material bond after the injection overmolding process.

In one embodiment of this invention, polymeric tubing is made from high density polyethylene which is crosslinked. PEX contains crosslinked bonds in the polymer structure changing the thermoplastic into a thermoset. Crosslinking may be accomplished during or after the molding of the part. Typically, the required degree of crosslinking for crosslinking polyethylene tubing, according to ASTM Standard F 876-93, is between 65-89%. However, in one example and if crosslinking occurs in multiple steps, crosslinking to a first degree occurs between 15-40%. Because crosslinking is cumulative, the second degree of crosslinking will result in a total crosslinking range of 65-89% in one example. There are three classifications of PEX, referred to as PEX-A, PEX-B, and PEX-C. PEX-A is made by peroxide (Engel) method. In the PEX-A method, peroxide blending with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during molding and during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. The permanent crosslinked shape is now stored while the sample shows the temporary shape. Heating the shape memory polymer above a transition temperature $T_{trans}$ induces the shape memory effect providing internal forces urging the crosslinked polymer toward its permanent or crosslinked shape. Alternatively or in addition to the application of an external stimulus, it is possible to apply an internal stimulus (e.g., the passage of time) to achieve a similar, if not identical result.

A chemical crosslinked network may be formed by low doses of irradiation. Polyethylene chains are oriented upon the application of mechanical stress above the melting temperature of polyethylene crystallites, which can be in the range between 60° C. and 13° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrocholorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made form stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and a poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the invention.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A reservoir comprising:
    a primary reservoir tank comprising an extruded elongated tube having a first tank end, a second tank end and a tank body, wherein the tank body is located between the first tank end and the second tank end;
    an inlet adaptor sealingly engaging the first tank end;
    an outlet adaptor sealingly engaging the second tank end;
    an inlet tube attached to the inlet adaptor;
    a secondary reservoir tank comprising an extruded elongated tube having a first tank end, a second tank end and a tank body, wherein the tank body is located between the first tank end and the second tank end;
    a secondary inlet adaptor sealingly engaging the first tank end of the secondary reservoir tank;
    a secondary outlet adaptor sealingly engaging the second tank end of the secondary reservoir tank;
    a connecting tube attached from the outlet adaptor of the first tank end of the primary reservoir tank to the secondary inlet adaptor of the first tank end of the secondary reservoir tank;
    a secondary outlet tube attached to the secondary outlet adaptor;
    a bracket assembly for securing the primary reservoir tank to the secondary reservoir tank, the bracket assembly including:

a first tank brace for securing the primary reservoir tank, a second tank brace for securing the secondary reservoir tank, and at least one aperture between the first tank brace and the second tank brace, where the connecting tube and one of the secondary outlet tube of the secondary reservoir tank or the inlet tube of the primary reservoir tank passes through the at least one aperture in the bracket assembly, and where the reservoir is configured to store water in a refrigeration system.

2. The reservoir of claim 1 where the extruded elongated tube of either the primary reservoir tank or the secondary reservoir tank includes a diameter larger than a diameter of the connecting tube.

3. The reservoir of claim 1 where the connecting tube and one of the secondary outlet tube of the secondary reservoir tank or the inlet tube of the primary reservoir tank are parallel to a length of the primary reservoir between the primary reservoir tank and the secondary reservoir tank.

4. The reservoir of claim 3 where the connecting tube and one of the secondary outlet tube of the secondary reservoir tank or the inlet tube of the primary reservoir tank are parallel to a length of the secondary reservoir tank between the primary reservoir tank and the secondary reservoir tank.

5. The reservoir of claim 1 where connecting tube and one of the secondary outlet tube of the secondary reservoir tank or the inlet tube of the primary reservoir tank are parallel between the primary reservoir tank and the secondary reservoir tank.

6. The reservoir of claim 1, the bracket assembly further comprising a second aperture between the first tank brace and the second tank brace.

7. The reservoir of claim 6 where one of the connecting tube and one of the secondary outlet tube of the secondary reservoir tank or the inlet tube of the primary reservoir tank passes through the second aperture in the bracket assembly.

8. The reservoir of claim 1, further comprising a second bracket assembly.

9. The reservoir of claim 1 where the bracket assembly includes a mounting structure adapted for securing the reservoir to a refrigerator.

10. The reservoir of claim 1 where the sealingly engagement of the inlet adaptor to the first tank end and the sealingly engagement of the outlet adaptor to the second tank end are thermal welds.

11. The reservoir of claim 1 where the sealingly engagement of the secondary inlet adaptor to the first tank end of the secondary reservoir tank and the sealingly engagement of the secondary outlet adaptor to the second tank end of the secondary reservoir tank are thermal welds.

12. The reservoir of claim 1 where the attachment of the inlet adaptor to the inlet tube is an overmold.

13. The reservoir of claim 12 where the attachment of the outlet adaptor to the connecting tube is an overmold.

\* \* \* \* \*